(12) United States Patent
Guan

(10) Patent No.: US 9,607,400 B2
(45) Date of Patent: Mar. 28, 2017

(54) MOVING OBJECT RECOGNIZER

(71) Applicant: Haike Guan, Kanagawa (JP)

(72) Inventor: Haike Guan, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/432,600

(22) PCT Filed: Oct. 30, 2013

(86) PCT No.: PCT/JP2013/080057
§ 371 (c)(1),
(2) Date: Mar. 31, 2015

(87) PCT Pub. No.: WO2014/077170
PCT Pub. Date: May 22, 2014

(65) Prior Publication Data
US 2015/0243043 A1    Aug. 27, 2015

(30) Foreign Application Priority Data

Nov. 19, 2012  (JP) ................................ 2012-252932
Jul. 29, 2013   (JP) ................................ 2013-156774

(51) Int. Cl.
*G06T 7/20*    (2006.01)
*B60Q 9/00*    (2006.01)
(Continued)

(52) U.S. Cl.
CPC ................ *G06T 7/20* (2013.01); *B60Q 9/008* (2013.01); *B60W 30/09* (2013.01);
(Continued)

(58) Field of Classification Search
CPC .................................. G06T 7/20; B60Q 9/008
See application file for complete search history.

(56) References Cited

U.S. PATENT DOCUMENTS 7,248,968 B2    7/2007  Reid
2004/0057599 A1 3/2004  Okada et al.
(Continued)

FOREIGN PATENT DOCUMENTS

CN    101179710 A    5/2008
CN    101216885 A    7/2008
(Continued)

OTHER PUBLICATIONS

International Search Report issued on Jan. 21, 2014 in PCT/JP2013/080057 filed on Oct. 30, 2013.
(Continued)

*Primary Examiner* — Basil T Jos
(74) *Attorney, Agent, or Firm* — Oblon, McClelland, Maier & Neustadt, L.L.P.

(57) ABSTRACT

A moving object recognizer includes an image input to receive stereo image signals from a stereo camera consecutively and output a stereo image, a brightness image generator to consecutively store frames of at least one of images of the output stereo image and generate a brightness image frame, a disparity image generator to calculate a disparity between the images of the stereo image output to the brightness image generator and generate a disparity image frame, an object recognizer to recognize an object at least from the brightness image frame, a tracking processor to track an object recognized at a certain time from an image frame through brightness image frames obtained from image frames subsequent to the image frame recognized at the certain time, and a change detector to detect a change in the state of the tracked object from the disparity image frame synchronized with the brightness image frame.

16 Claims, 14 Drawing Sheets

(51) Int. Cl.
*G06K 9/00* (2006.01)
*G06K 9/62* (2006.01)
*G08G 1/16* (2006.01)
*B60W 30/09* (2012.01)
*G06T 7/00* (2017.01)
*G06T 7/40* (2017.01)
*H04N 7/18* (2006.01)

(52) U.S. Cl.
CPC ....... *G06K 9/00805* (2013.01); *G06K 9/6256* (2013.01); *G06T 7/004* (2013.01); *G06T 7/408* (2013.01); *G08G 1/166* (2013.01); *G06T 2207/10012* (2013.01); *G06T 2207/30252* (2013.01); *H04N 7/18* (2013.01)

(56) References Cited

U.S. PATENT DOCUMENTS

| | | | |
|---|---|---|---|
| 2011/0135159 A1 | 6/2011 | Uchida | |
| 2012/0207348 A1* | 8/2012 | Saito | G08G 1/04 382/103 |
| 2013/0088578 A1* | 4/2013 | Umezawa | G06T 7/0075 348/47 |
| 2013/0322692 A1 | 12/2013 | Guan | |
| 2014/0098196 A1 | 4/2014 | Guan | |

FOREIGN PATENT DOCUMENTS

| | | |
|---|---|---|
| CN | 102016921 A | 4/2011 |
| EP | 2 246 806 A1 | 11/2010 |
| JP | 10-255071 | 9/1998 |
| JP | 2000-266539 | 9/2000 |
| JP | 2004-32460 | 1/2004 |
| JP | 2005-215779 | 8/2005 |
| JP | 2006-134035 | 5/2006 |
| JP | 2009-140023 | 6/2009 |
| JP | 2010-39634 | 2/2010 |
| JP | 2010-286926 | 12/2010 |
| JP | 2011-221613 | 11/2011 |
| JP | 2014-26396 | 2/2014 |
| JP | 2014-96135 | 5/2014 |
| JP | 2014-211855 | 11/2014 |
| WO | WO 2010/094401 A1 | 8/2010 |

OTHER PUBLICATIONS

Extended European Search Report issued Mar. 24, 2016 in Patent Application No. 13855837.4.

T. Kowsari et al: "Real-Time Vehicle Detection and Tracking Using Stereo Vision and Multi-View AdaBoost", 2011 14th International IEEE Conference on Intelligent Transportation Systems (ITSC), XP032023367, Oct. 5-7, 2011, pp. 1255-1260.

Alper Yilmaz et al., "Object Tracking", ACM Computing Surveys, vol. 38, No. 4, XP055053833, Dec. 25, 2006, 45 pages.

D. M. Gavrila, "Multi-cue Pedestrian Detection and Tracking from a Moving Vehicle", International Journal of Computer Vision, vol. 73, No. 1, XP019468627, 2007, pp. 41-59.

Office Action issued Nov. 21, 2016 in Chinese Patent Application No. 201380060106.4 (with English language translation).

* cited by examiner

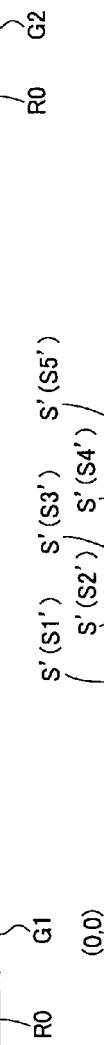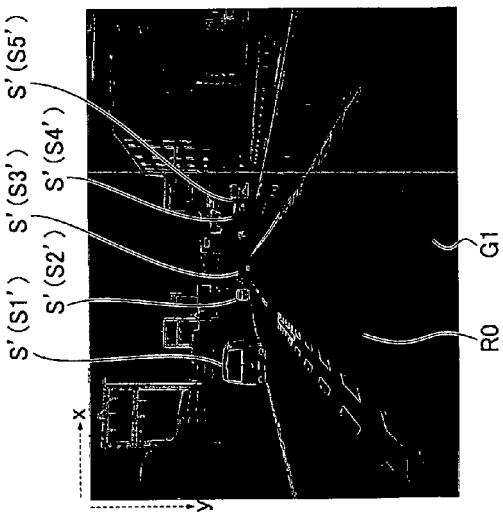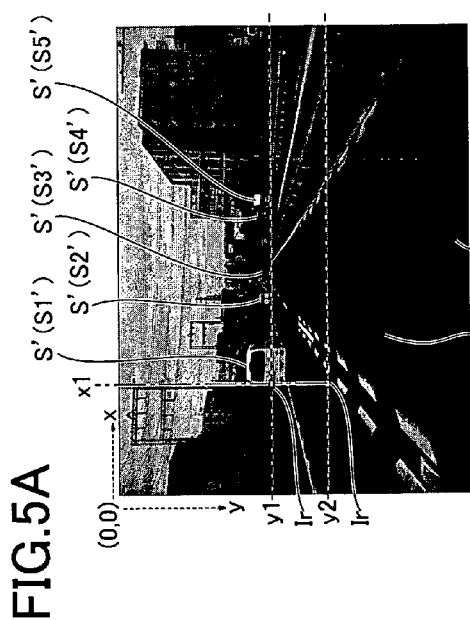

MOVING OBJECT RECOGNIZER

CROSS REFERENCE TO RELATED APPLICATION

The present application is based on and claims priority from Japanese Patent Application No. 2012-252932, filed on Nov. 19, 2012 and No. 2013-156774, filed on Jul. 29, 2013, the disclosure of which is hereby incorporated by reference in its entirety.

TECHNICAL FIELD

The present invention relates to a moving object recognizer, a program for moving object recognition, and a vehicle incorporating the moving object recognizer.

BACKGROUND ART

A moving object recognizer has been developed to recognize a change in the velocity and motion of an object such as a pedestrian, a vehicle ahead and find a dangerous situation as a pedestrian's sudden jumping-in, another vehicle's cutting-in, to be able to warn a driver thereof for prevention of such a danger.

For example, there is a technique for moving object recognition to find a change in the distance to a moving object ahead according to a change in the size of the moving object between two-dimensional image frames and the focal length of a camera. However, this technique cannot accurately measure the distance to the moving object or accurately detect a change in the motion of the object.

In view of the above, Japanese Patent Application Publication No. 2000-266539, for instance, discloses an inter-vehicular distance measuring unit for calculating a disparity from a stereo image obtained with a stereo camera to generate a disparity image or a range image. The disparity image refers to an image whose pixel value is a disparity value.

This measuring unit is configured to detect a vehicle ahead from the disparity image, find a moving vector of the edge of the vehicle, and calculate an inter-vehicular distance and a change in the distance according to the magnitude and direction of the moving vector.

This measuring unit recognizes a moving object from the disparity image alone and obtains the disparity image by image matching in unit of block or window. Because of this, it has a drawback that the spatial resolution of the disparity image is low. For instance, it cannot accurately detect the distance to a vehicle ahead having a non-planar rear part.

DISCLOSURE OF THE INVENTION

The present invention aims to provide a moving object recognizer which can improve the accuracy at which a moving object is recognized and at which a change in the motion of the object is detected, a program for moving object recognition, and a vehicle incorporating such a moving object recognizer.

According to one aspect of the present invention, a moving object recognizer comprises an image input to receive stereo image signals from a stereo camera consecutively and output a stereo image, a brightness image generator configured to consecutively store frames of at least one of images of the stereo image output from the image input and generate a brightness image frame, a disparity image generator configured to calculate a disparity between the images of the stereo image output to the brightness image generator from the image input and generate a disparity image frame, an object recognizer configured to recognize an object at least from the brightness image frame, a tracking processor configured to track an object recognized at a certain time from an image frame by the object recognizer through brightness image frames obtained from image frames subsequent to the image frame recognized at the certain time, and a change detector to detect a change in a state of the tracked object from the disparity image frame synchronized with the brightness image frame.

BRIEF DESCRIPTION OF THE DRAWINGS

Features, embodiments, and advantages of the present invention will become apparent from the following detailed description with reference to the accompanying drawings:

FIGS. 5A to 5C show one image of a stereo image captured by a left-side lens system, the other image of a stereo image captured by a right-side lens system, and a disparity image generated from the stereo image, respectively, by way of example;

DESCRIPTION OF EMBODIMENTS

Figure 1:
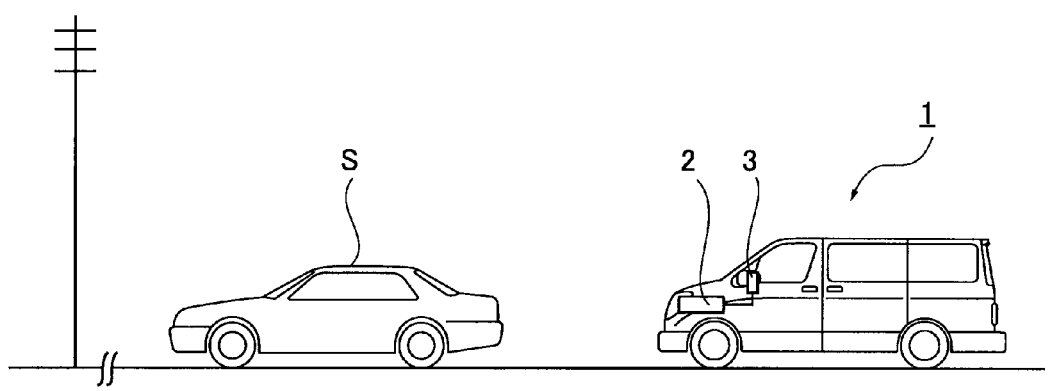
FIG. 1 schematically shows a vehicle incorporating a moving object recognizer according to one embodiment of the present invention.

Hereinafter, one embodiment of a moving object recognizer will be described in detail with reference to the accompanying drawings. Wherever possible, the same reference numbers will be used throughout the drawings to refer to the same or like parts. FIG. 1 schematically shows the exterior of a vehicle 1 incorporating a moving object recognizer according to the present embodiment.

In FIG. 1 the vehicle 1 includes a moving object recognizer 2 to track a target moving object S and a warning unit 3 on a vehicle body.

Figure 2:
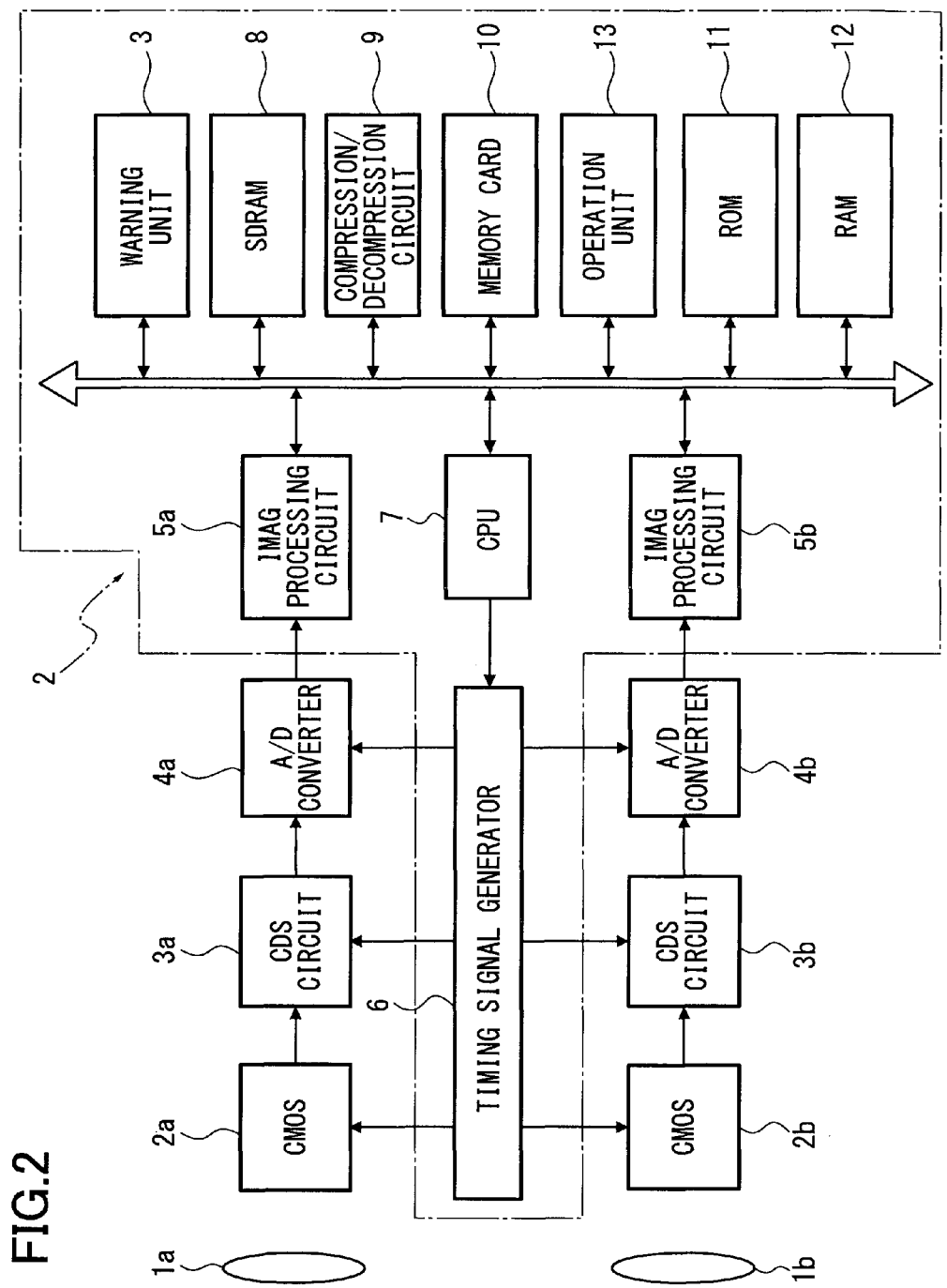
FIG. 2 shows the hardware configuration of a stereo camera and the moving object recognizer shown in FIG. 1.

FIG. 2 is a block diagram of the hardware configuration of an in-vehicle stereo camera and the moving object recognizer 2. The moving object recognizer 2 comprises circuits to process signals from the stereo camera, as shown in FIG. 2 and it can be included in the stereo camera. The stereo camera includes two left and right lens systems 1a, 1b, two left and right CMOSs (complementary metal oxide semiconductor) 2a, 2b as image sensors, CDS circuits 3a, 3b and A/D converters 4a, 4b.

The light from a subject is imaged on the CMOSs 2a, 2b via the lens systems 1a, 1b. The CMOSs 2a, 2b convert an optical image into an electric signal and output it as analog image data to the left and right CDS (correlated double sampling) circuits 3a, 3b.

The CDS circuits 3a, 3b remove noise components from the analog image data output from the CMOS s 2a, 2b and output the image data to A/D converters 4a, 4b. The A/D converters 4a, 4b convert the analog image data to digital image data and output it to image processing circuits 5a, 5b.

The CMOSs 2a, 2b, CDS circuits 3a, 3b, A/D converters 4a, 4b are controlled by a timing signal output from a timing signal generator 6 which is controlled by a CPU 7. The CPU 7 also controls the image processing circuits 5a, 5b, a later-described compression/decompression circuit and a memory card.

The image processing circuits 5a, 5b perform various kinds of image processing such as Y, Cr, Cb conversion, white balance correction, contrast correction, edge enhancement, and color conversion on image data temporarily stored in SDRAM (synchronous DRAM).

The white balance correction is to adjust the color density of image information while the contrast correction is to adjust the contrast of image information. The edge enhancement is to adjust the sharpness of image information and the color conversion is to adjust the color shade of image information.

The image information is subjected to signal processing and image processing and stored in a memory card 10 via a compression/decompression circuit 9. The compression/decompression circuit 9 compresses the digital image data from the image processing circuits 5a, 5b and outputs it to the memory card 10 and decompresses image information read from the memory card 10 and outputs it to the image processing circuits 5a, 5b.

The CPU 7 computes various kinds of data by a computer-readable program for moving object recognition. The CPU 7 incorporates a ROM (read only memory) 11 storing the program, a work area, and a RAM (random access memory) 12 having data storage areas and is connected with them via a bus line. By the manipulation of an operation unit 13, the moving object recognizer 2 executes its functions.

Figure 3:
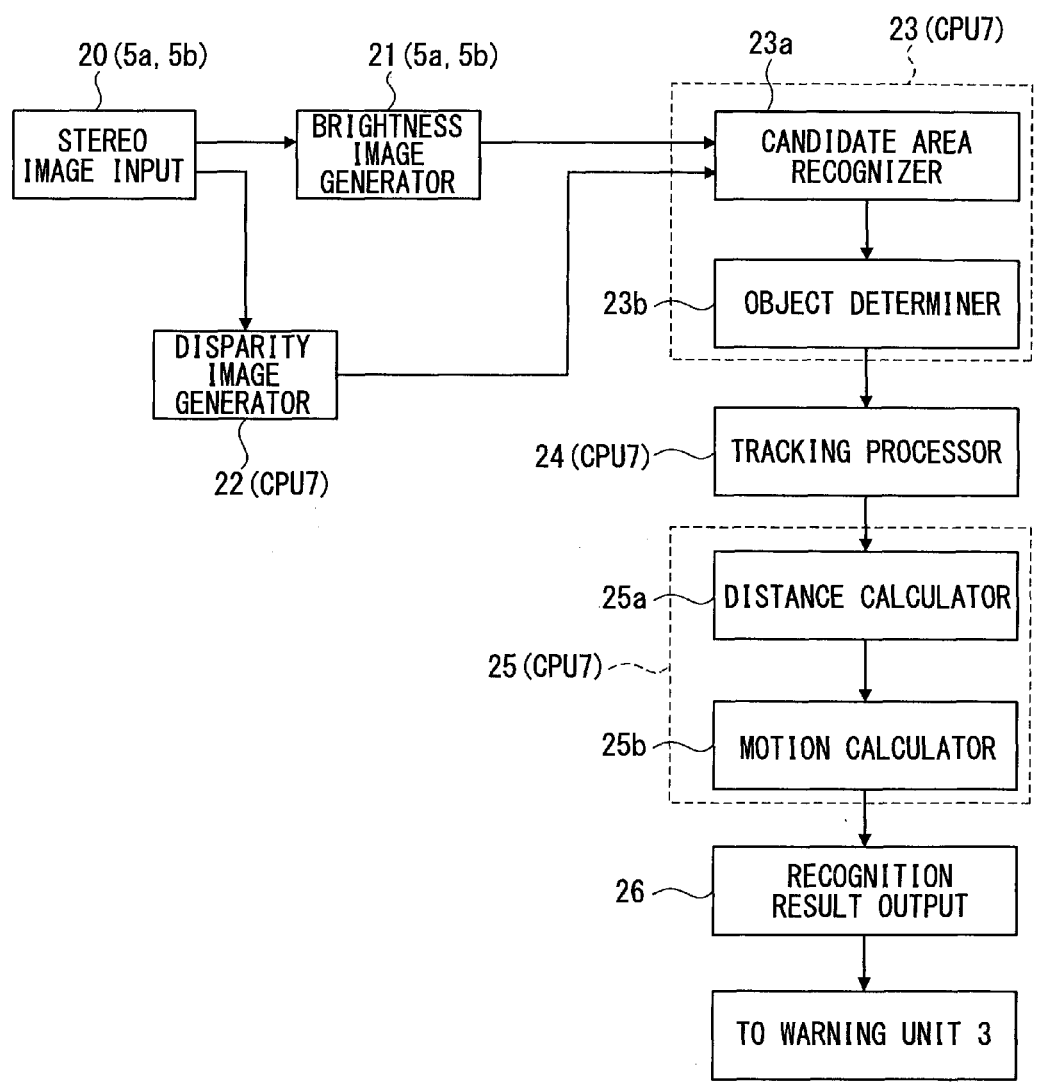
FIG. 3 is a block diagram for the functions of the moving object recognizer in FIG. 2.

Referring to FIG. 3, the processing of the CPU 7 of the moving object recognizer is described. The CMOS s 2a, 2b, CDS circuits 3a, 3b, and A/D converters 4a, 4b of the stereo camera function as an image output from which stereo image signals are consecutively output.

The image processing circuits 5a, 5b function as an image input 20 to receive the stereo image signals output from the image output and output a stereo image and as a brightness image generator 21 to consecutively store frames of at least one of images of the stereo image output from the image input and generate a brightness image frame on the basis of each frame of one of the images of the stereo image.

The program stored in the ROM 11 is loaded on the CPU 7. The CPU 7 functions as a disparity image generator 22 to calculate a disparity between the images of the stereo image output from the image input 20 to the brightness image generator 21 and generate a disparity image frame.

Further, the CPU 7 functions as an object recognizer 23 to recognize an object from the brightness image frame from the brightness image generator 21 and the disparity image frame from the disparity image generator 22, a tracking processor 24 to track the recognized object through image frames, and a change detector 25 to calculate a change in the motion of the object from the disparity image frame.

Results of the detection of the change detector 25 are consecutively output to the screen of the warning unit 3. The warning unit 3 is configured to issue a warning to a driver in accordance with a state of the object, for example, by displaying a mark or a text as a warning for another vehicle's cutting-in, a person's jumping-in on the screen. Warning can be issued with audio.

The object recognizer 23 comprises a candidate area recognizer 23a to recognize a candidate area of an object from the disparity image frame, and an object determiner 23b to determine a target object to be tracked according to the disparity image frame and the brightness image frame.

The tracking processor 24 tracks, in a current brightness image frame, the target object determined by the object recognizer from the brightness image frame and disparity image frame of a previous image frame. Alternatively, it can be configured to track a target object determined from the brightness image frame and disparity image frame of an image frame acquired at a certain time through brightness image frames acquired after the certain time.

The change detector 25 comprises a distance calculator 25a to calculate a change amount of the object relative to the vehicle 1 in a front-back direction and a motion calculator 25b to calculate a change amount of the object relative to the vehicle 1 in a transverse direction. The change amount in the front-back direction includes a change in distance and a change in velocity or acceleration in the front-back direction. Meanwhile, the change amount in the transverse direction includes a change in distance and a change in velocity or acceleration in the transverse direction. The change in the velocity in the front-back direction corresponds to, for example a situation that a vehicle ahead rapidly accelerates while the vehicle 1 is driving at a constant velocity. The change in the velocity in the transverse direction corresponds to, for example, a situation that a vehicle ahead changes lanes.

Figure 4:
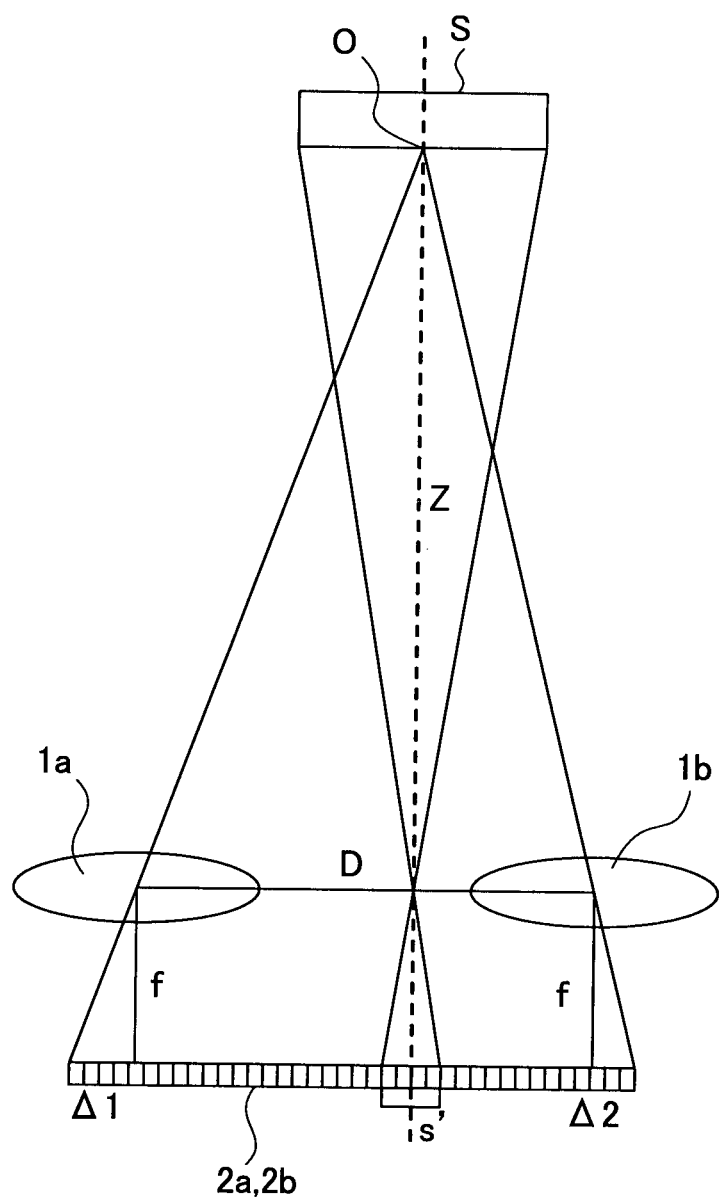
FIG. 4 shows a relation between the structure of the stereo camera and disparity.

Now, FIG. 4 shows the relation between the object S and the image captured with the stereo camera. As shown in the drawing, an imaging point O of the object S is imaged on the imaging plane of the CMOS s 2a, 2b by the lens systems 1a, 1b.

Disparity $\Delta$ is obtained by $\Delta=\Delta 1+\Delta 2$ where $\Delta 1$, $\Delta 2$ are shift amounts from the imaging center. In FIG. 4 f is the focal length of the lens systems 1a, 1b, D is the distance between the optical axes of the lens systems 1a, 1b or base length, and Z is the distance from the stereo camera to the moving object S. The shift amounts $\Delta 1$, $\Delta 2$ are determined by the imaging position of the imaging point O. Herein, the symbol $\Delta$ also refers to disparity value and average disparity value.

The distance Z to the moving object S can be obtained by the equation, $Z=D*(f/\Delta)$. The disparity image generator 22 calculates the disparity $\Delta$ for each pixel by $\Delta=\Delta 1+\Delta 2$ while the distance calculator 25a calculates the distance Z to the imaging point of the object S by the equation, $Z=D*(f/\Delta)$.

An image S' of the object S is formed on the CMOSs 2a, 2b in FIG. 4. It is assumed that the optical axes of the lens systems 1a, 1b are parallel to a horizontal or transverse direction and the pixel lines of left and right images do not longitudinally shift relative to the horizontal optical axes. Alternatively, the optical axes of the lens systems 1a, 1b can be parallel to a longitudinal direction.

FIGS. 5A, 5B show a left image G1 and a right image G2 of the stereo image of the object S formed on the CMOSs 2a, 2b, respectively and FIG. 5C shows a disparity image acquired from the stereo image. Because of disparity, the images G1 and G2 are formed at different positions on the CMOS s 2a, 2b, and temporarily stored in a memory area of the RAM 12, for example.

The brightness image frame and disparity image frame are generated from the images G1, G2, and a brightness image and a disparity image captured at the same time, that is, continuous image frames, the brightness image frames synchronized with the disparity image frames, are generated. The coordinates on the image in the brightness image frame correspond to those on the image in the disparity image frame one by one.

The disparity image is for example obtained in the following manner.

First, a disparity when transverse lines at heights y1, y2 cross the object S' (S1') and a road area R0 in FIG. 5A is described. Disparity values of pixels on the transverse line at height y1 are set to " . . . , 5, 4, . . . , 12, . . . , 4, . . . , 1, 1, . . . ", for example. Disparity values "12, 12, . . . ," signify the object S' (S1') and disparity values "1, 1, . . . " signify the road area R0.

Specifically, the disparity value of 12 at the pixel on the transverse line at y1 represents a vehicle as the object S about 10 m ahead of the vehicle 1 in FIG. 1 while the disparity value of 1 represents the road area further from the vehicle 1 than the vehicle ahead.

Further, disparity values of pixels on the transverse line at height y2 are set to " . . . , 25, 25, . . . , 24, . . . , 24, 25 . . . ,", for example. They signify the road area R0 closer to the vehicle 1 than the vehicle ahead. To create a disparity image, the two images G1, G2 are each divided into blocks Ir, as shown in FIGS. 5A, 5B. Their respective blocks Ir are assumed to match each other when a difference therebetween is smallest, to find a disparity value. The optimal value of the size of the blocks Ir is found by experiment and adjusted before setting.

For instance, the images G1, G2 with 1,280 by 960 pixels are divided into 5 by 5 blocks Ir and the blocks Ir of the left image G1 and right image G2 are subjected to block matching. The block Ir of the left image G1 on the y1 line is at the coordinate (x1, y1) relative to the original coordinate (0, 0), that is, at the border of a forward scenery on the left side and a left white portion of the image S1' of the object S. The total sum of the brightness values of this block Ir is set to Ir(x1, y1), for instance. Meanwhile, the block Ir of the right image G2 is moved from the position (0, y1) to the position (x1+Δ, y1). The total sum of the brightness values of the block Ir at (0, y1) is Ir (0, y1) and that of the brightness values thereof at (x1+Δ, y1) is Ir (x1+Δ, y1). The block Ir of the left image G1 is located at the border of the object image S1', and a left half thereof is dark and a right half thereof is light. Meanwhile, the block Ir of the right image G2 is located at (0, y1) and dark as a whole. Therefore, a difference in the total sums Ir (x1, y1) and Ir (0, y1) of the blocks Ir of the images G1, G2 is large so that the two blocks are not determined to match each other.

While the block Ir of the image G2 is being moved from (0, y1) to (x1+Δ, y1), the difference in the total sums Ir (x1, y1) and Ir (0, y1) of the blocks Ir is calculated in order. It turns out that the difference becomes smallest when the block Ir of the image G2 is located at the position (x1+Δ, y1), and the blocks Ir are determined to match. The disparity Δ is then found from the blocks. The disparity Δ is 12, for example, since the blocks Ir are at the border of the object image S1'.

Then, the blocks Ir are moved from the y1 transverse line to y2 transverse line and moved in X direction on both the transverse lines for block matching. The disparity Δ is obtained at the border of the object image S1' sequentially. Further, when the block Ir is located at the border of a white line marking on the left image G1, the block Ir of the right image G2 is moved from (0, y2) to (x1+Δ, y2) on the y2 transverse line. The total sum of the brightness values of the block Ir at (0, y2) is Ir(0, y2) while that of the block Ir at (x1+Δ, y2) is Ir(x1+Δ, y2). The block Ir of the left image G1 is located at the border of the white line marking, and a left half thereof is dark and a right half thereof is light. Meanwhile, the block Ir of the right image G2 is located at (0, y2) and is dark as a whole. Therefore, a difference in the total sums Ir (x1, y1) and Ir (0, y2) of the blocks Ir of the images G1, G2 is large so that the two blocks are not determined to match each other.

While the block Ir of the image G2 is being moved from (0, y2) to (x1+Δ, y2), the difference in the total sums Ir (x1, y2) and Ir (0, y2) of the blocks Ir is calculated. The difference becomes smallest when the block Ir of the image G2 is located at the position (x1+Δ, y2), and both the two blocks Ir are determined to match. The disparity Δ is then found from the blocks. The disparity Δ is 24 or 25 when the blocks Ir are at the border of the white line marking, for example. The blocks Ir may match at positions on the y2 transverse line other than the white line marking. A disparity image as shown in FIG. 5C is thus obtained. In the disparity image a portion with a large disparity value is represented with a large brightness value while a portion with a small disparity value is represented with a small brightness value. There are a large number of points in an image portion with a high contrast at which the blocks Ir match so that the number of bright points is large at the border.

The candidate area recognizer 23a recognizes a candidate area of a moving object S' from the disparity image frame. A vehicle or person as a moving object is present on the road so that a candidate area thereof can be recognized by recognizing a road area R0 on the image.

Figure 6:
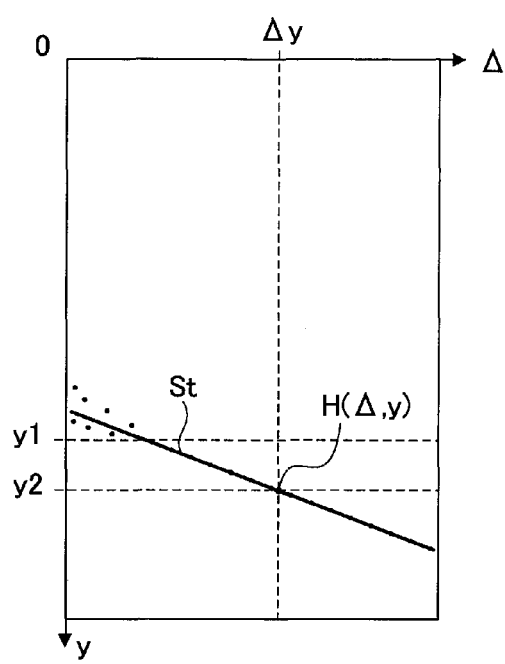
FIG. 6 shows an example of horizontal histogram of disparity created from the disparity image frame.

Thus, the candidate area recognizer 23a creates a horizontal disparity histogram according to the disparity image obtained by the disparity image generator 22, as shown in FIG. 6. FIG. 6 shows a distribution of frequencies of the number of pixels having a disparity value Δ. The abscissa axis shows the magnitude of disparity Δ and the longitudinal axis shows the height y of a disparity image. In the graph the number of pixels corresponds to a histogram value H (Δ, y) of disparity values of a single line of a disparity image at height y (for example, y2 transverse line). The histogram values H (Δ, y) are plotted in vertical direction in FIG. 6, and represent the number of pixels.

A disparity histogram of one transverse line at height y in the road area R0 has a peak at a disparity value Δy since the pixels on the line have the same disparity value Δy. In other words, in the road area R0 the disparity value Δy of the transverse line at height y is constant and the number of pixels on this line is largest.

The disparity value Δy of the road area R0 is large when the distance from the vehicle 1 is short and it is small when the distance is long. The disparity value Δy gradually decreases from the y2 transverse line to the y1 transverse line in the road area R0. Therefore, connecting the peaks of the number of pixels generally makes a straight line St in the portion of the horizontal disparity histogram of FIG. 6 corresponding to the road area R0. The road area R0 can be thus specified by the detection of the straight line St. Moreover, along with a decrease in the disparity value Δy, the number of pixels in areas other than the road area R0 increases. Thus, the histogram values H(Δ, y) of the other areas are also plotted in FIG. 6. For instance, a disparity value Δy1 of the y1 line of the road area R0 in FIGS. 5A, 5B is 1. The number of pixels thereof is smaller than that of a background area other than the road area R0. Because of this, the histogram values H(Δ, y) irrelevant to the road area R0 are plotted.

The straight line St can be found by known Hough transformation. The pixels on the straight line St are detected in the horizontal disparity histogram and mapped in the disparity image frame. That is, the pixels on the straight line St in FIG. 6 are related to those of the road area in the disparity image frame.

Figure 7:
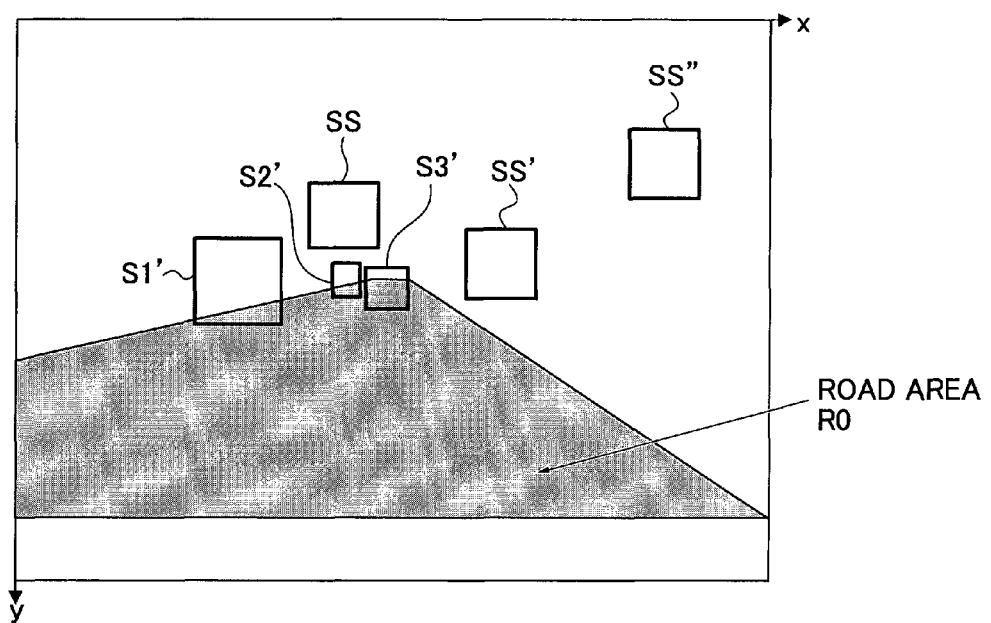
FIG. 7 schematically shows the relation between a road area and a moving object.

The road area R0 can be created by finding the pixels corresponding to the road area R0 and interpolating each point between the pixels. FIG. 7 shows the road area R0 in the image. The road area can be recognized from the brightness image frame instead of the disparity image frame by recognizing a road shoulder or a white line marking.

The road area R0 is used in finding a candidate area of object. The object S to be tracked as a vehicle or a person overlaps with the road area R0. In FIG. 7 the vehicles as objects S (S1', S2', S3') overlaps with the road area R0. The objects S (SS, SS', SS") do not overlap with the road area R0 so that they are determined as a non-target object S.

The object determiner 23b determines the object S to be tracked on the basis of the brightness image frame generated by the brightness image generator 21. By machine learning, an object recognition dictionary is created in advance from learning data on the target object S. Depending on the types of the target object S, different object recognition dictionary need to be created.

To recognize vehicles, for example, a dictionary for recognizing vehicles as a target needs to be created while to recognize pedestrians, a dictionary for recognizing pedestrians as a target needs to be created. Thus, a dictionary for each target object is created.

Figure 8:
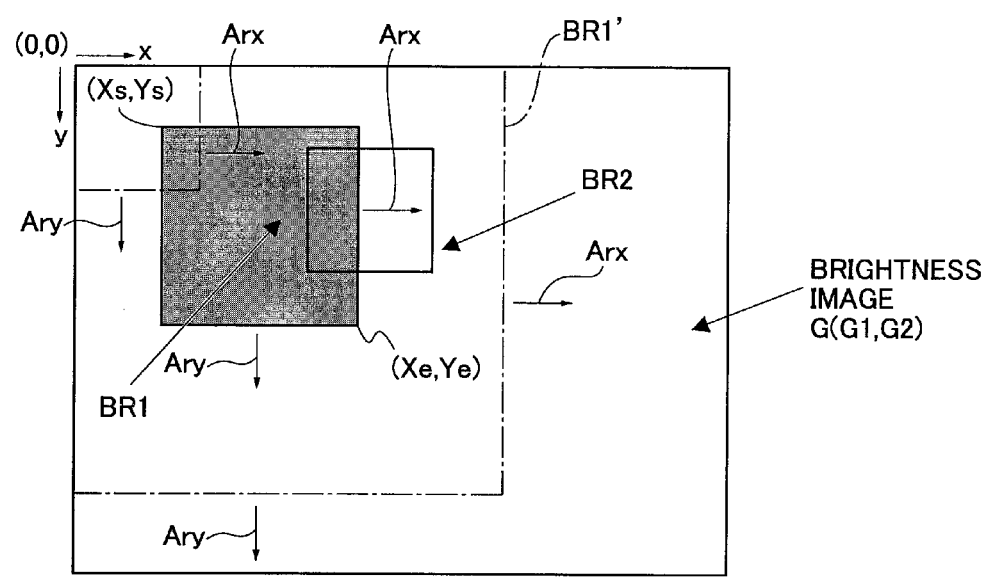
FIG. 8 schematically shows a rectangular block on a brightness image.

To recognize a target object S, a rectangular block BR1 is set in the brightness image G (G1 or G2) as shown in FIG. 8. The coordinates (Xs, Ys), (Xe, Ye) of the top left corner and bottom right corner of the block BR1 are determined by the size and position of the block BR1 in the brightness image G. The size of the block BR1 is selected in order from large to small.

According to the present embodiment, the rectangular block BR1 is normalized so that the process time for the generation of large-size block BR1 to small-size block BR2 does not change. It is likely that the moving objects present immediately ahead of the vehicle 1 are few, therefore, the number of candidates needing a large-size block BR1 is few while that of candidates needing a small-size block BR1 is large. Note that a rectangular block BR2 corresponds to the object S1' in FIGS. 5A, 5B.

The number of the large-size blocks BR1 is small in the brightness image. Thus, it is made possible to detect a target object in a shorter time by searching for a target object in order, using from the large-size block BR1 to the small-size block BR2. Further, sensible velocity increases when a detected large object S is output.

For example, the large-size block BR1' is scanned in the directions indicated by the arrows Arx, Ary in the brightness image G (G1, G2), then, the block BR1 smaller than the block BR1' is scanned, searching for the object to be tracked.

Figure 9A:
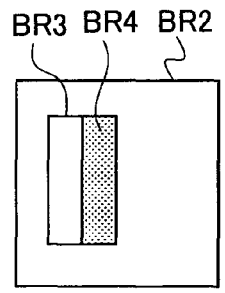
FIGS. 9A to 9F show division patterns of the rectangular block and how to find a characteristic amount of the rectangular block using the division pattern, by way of example.
Figure 9B:
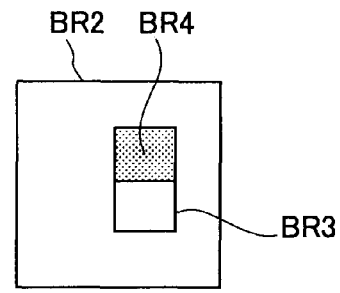
Figure 9C:
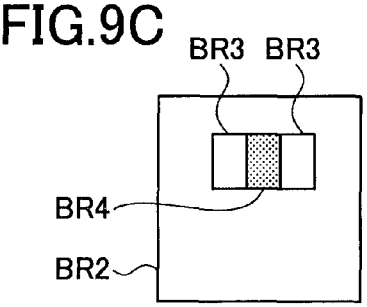
Figure 9D:
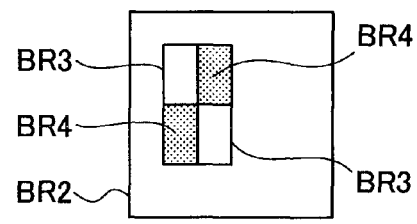

The candidate area recognizer 23a calculates the characteristic amounts of black and white rectangular areas in the block BR2 as a candidate area, for instance. FIGS. 9A to 9D show the four examples of typical division patterns for acquiring the characteristic amounts of a vehicle. In FIG. 9A the block BR2 is divided into rectangular areas, a white area BR3 and a black area BR4 horizontally. In FIG. 9B the block BR2 is divided into a white area BR3 and a black area BR4 vertically. In FIG. 9C the block BR2 is divided into three rectangular areas horizontally, placing a black area BR4 between two white areas BR3. In FIG. 9D the block BR2 is divided into four rectangular areas, arranging white areas BR3 and black areas BR4 diagonally.

The white and black areas BR3, BR4 are superimposed on the block BR2 to find the total sum of brightness values of the pixels in the areas BR3, BR4. Then, the difference in the total sums of the brightness values between the block BR2 corresponding to the white area BR3 and the block BR2 corresponding to the black area BR4 is found as the characteristic amount ht (x).

Figure 9E:
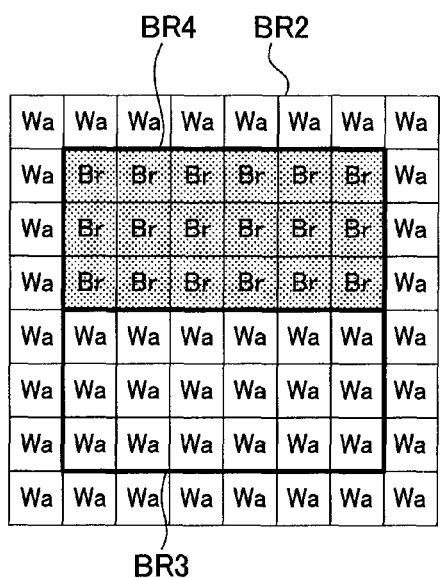

In the following the calculation of the characteristic amount of the block BR2 is described by way of example. The block BR2 corresponds to the object S1' in FIG. 5A, for example. The object S1' is approximately rectangular and a bottom vehicle body is white and a window in a top part appears black. The characteristic amount of the block BR2 is calculated using the division pattern in FIG. 9B. In FIG. 9E the brightness values of the pixels in the top half of the block BR2 are Br=0 (black), and those in the bottom half of the block BR2 are Wa=255 (white). In this case the total sum of the brightness values in the portion of the block BR2 corresponding to the black area BR4 is ΣBr while that in the portion of the block BR2 corresponding to the white area BR3 is ΣWa. ΣBr is a product of the number of pixels having the brightness values Br and the brightness values Br, and ΣBr=0. Likewise, Σwa is a product of the number of pixels with the brightness values Wa and the brightness values Wa=255. Thus, the characteristic amount ht(x)=ΣWa−ΣBr is much larger than 0.

Figure 9F:
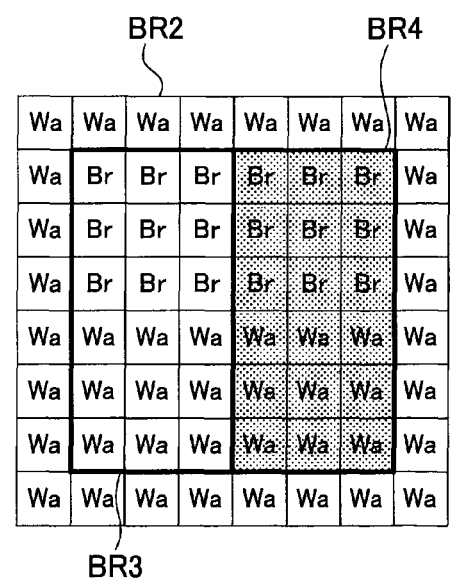

Further, the characteristic amount of the object S1' in FIG. 5A is calculated using the division pattern in FIG. 9A. As shown in FIG. 9F, the total sum of the brightness values of the left half of the block BR2 corresponding to the white area BR3 is Σ (Wa+Br), for example. Likewise, the total sum of the brightness values of the right half of the block BR2 corresponding to the black area BR4 is Σ (Br+Wa). In FIG. 9F the brightness values of the block BR2 are symmetric and the characteristic amount ht(x)=0. As described above, using the sizes and patterns of the white and black areas BR3, BR4 in FIGS. 9A to 9D, the characteristic amount $h_t(x)$ is calculated, and an evaluation value $f_t(x)$ is calculated from the characteristic amount $h_t(x)$.

The evaluation value $f_t(x)$ is calculated by the following equation with a weight coefficient $\alpha_t$ taken into account:

$$f(x) = \sum_{t=1}^{T} \alpha_t h_t(x) \qquad (1)$$

where t is the number of characteristic amount and T is the total number of characteristic amounts.

The evaluation function includes the characteristic amount $h_t(x)$ and weight coefficient $\alpha_t$. The weight coefficient is calculated in advance by machine learning. That is, learning data on the target object is collected and learned to find the characteristic amount and weight coefficient.

Figure 10:
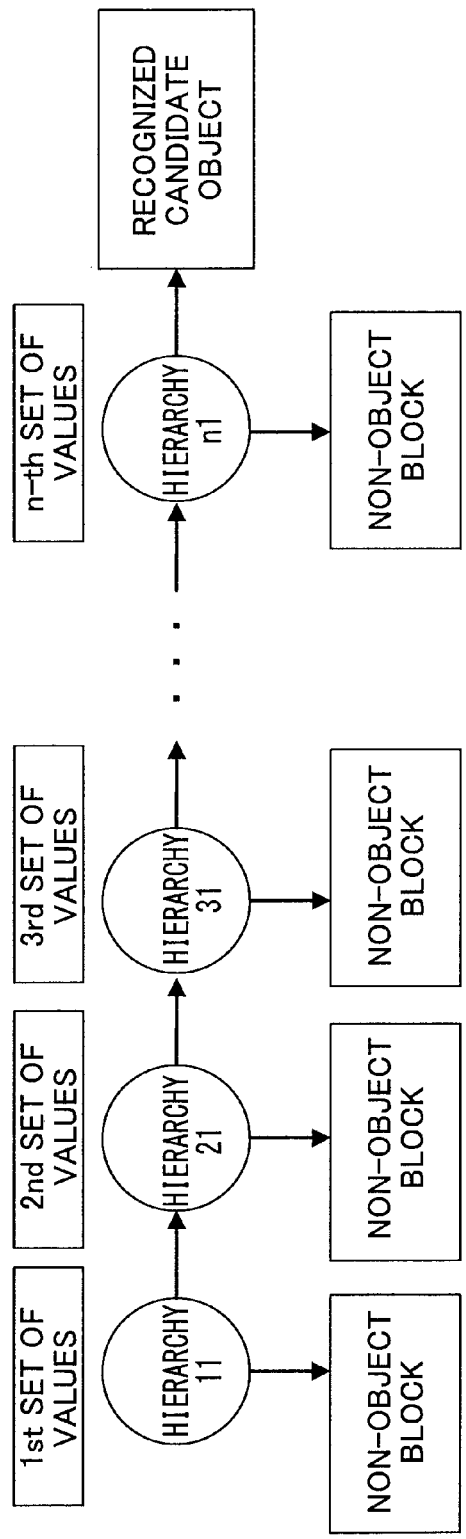
FIG. 10 shows a multi-hierarchy structure of an object recognizer.

The recognition of the target object is executed by an object recognizer having hierarchies and the evaluation function (1) in each hierarchy, as shown in FIG. 10. It determines that the block is not an object if the value of the evaluation function is smaller than a preset threshold, and aborts the evaluation of the block BR1. In each hierarchy (from 11 to n1; n being positive integer) the evaluation value is calculated. The block BR1 determined not to be a non-object in the last hierarchy is determined as a candidate area.

The characteristic amount $h_t(x)$, weight coefficient $\alpha_t$, and the threshold of the evaluation value $f_t(x)$ in each hierarchy are obtained in advance by machine learning on an object and a non-object. A not-shown recognition dictionary stores the characteristic amount $h_t(x)$, weight coefficient $\alpha_t$, coordinate value of an intersection at the top left corner of four corners at which two sides of the block intersect, the vertical and horizontal widths or size of the block, coordinate value of an intersection at the top left corner of four corners at which two sides of the white or black area intersect, the size of the white and black areas, and the thresholds of the evaluation value. For instance, to roughly determine if the block has the characteristics of a vehicle, the evaluation value $f_t(x)$ is calculated using the division pattern in FIGS. 9A to 9D and the calculated evaluation value and threshold are compared. The weight coefficient $\alpha_t$ is set such that the higher the hierarchy, the smaller the weight coefficient $\alpha_t$.

With use of the division pattern in FIG. 9A, the evaluation value ft(x) for the object S1' in FIG. 5A is zero. Accordingly, in the hierarchy 11 the object S1' is determined to be a non-object and the evaluation thereof is aborted. Next, the division pattern in FIG. 9B is used. The evaluation value ft(x) for the object S1' in FIG. 5A is larger than the threshold so that the candidate area recognizer 23a proceeds to the hierarchy 21. In the hierarchy 21 a larger number of division patterns are used to evaluate the evaluation value ft(x). With the evaluation value ft(x) being over the threshold, the block is determined as a candidate area, the recognizer 23a proceeds to the next hierarchy 31. By repeating such an operation, a candidate area is extracted. At the last hierarchy n1, the block BR2 not determined as a non-object is determined as a candidate area.

There may be a case where the determined candidate area does not overlap with the road area R0. In view of this, the weight for the road area R0 is set to 1 and that for the other areas is set to zero. When the weights for the candidate area are all zero, the object recognition is not executed since the object S does not overlap with the road area R0. When any of the weights is 1 in the candidate area, the object recognition is executed. Herein, the candidate area is determined first and then a determination is made on whether the candidate area overlaps with the road area R0, however, the order of the operation can be reverse.

Figure 11:
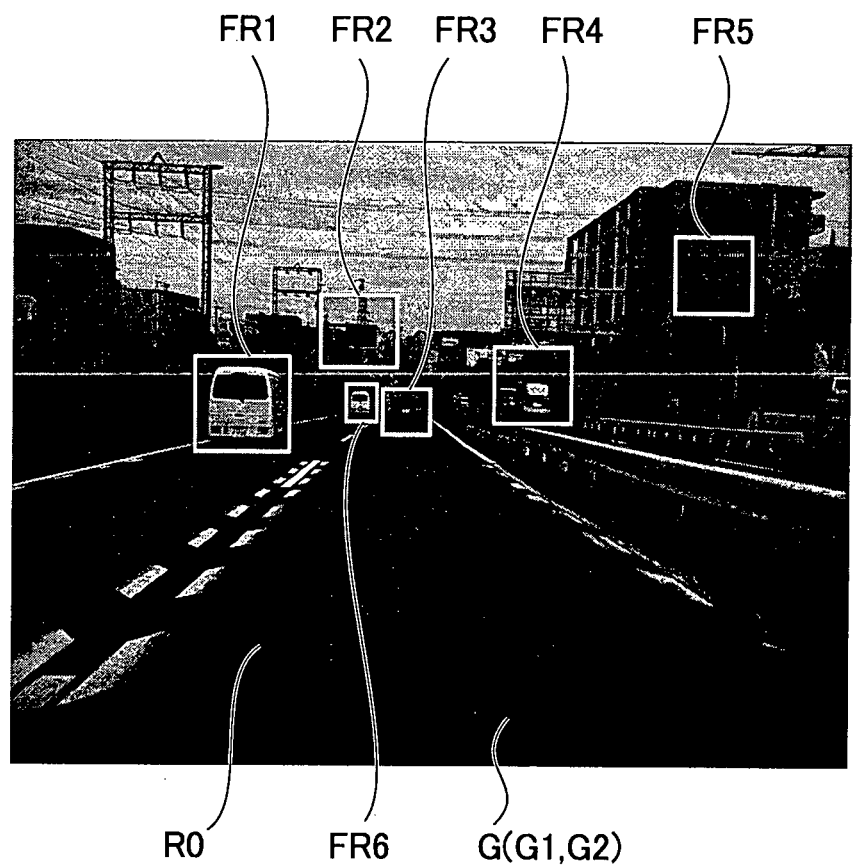
FIG. 11 shows recognized candidate areas.
Figure 12:
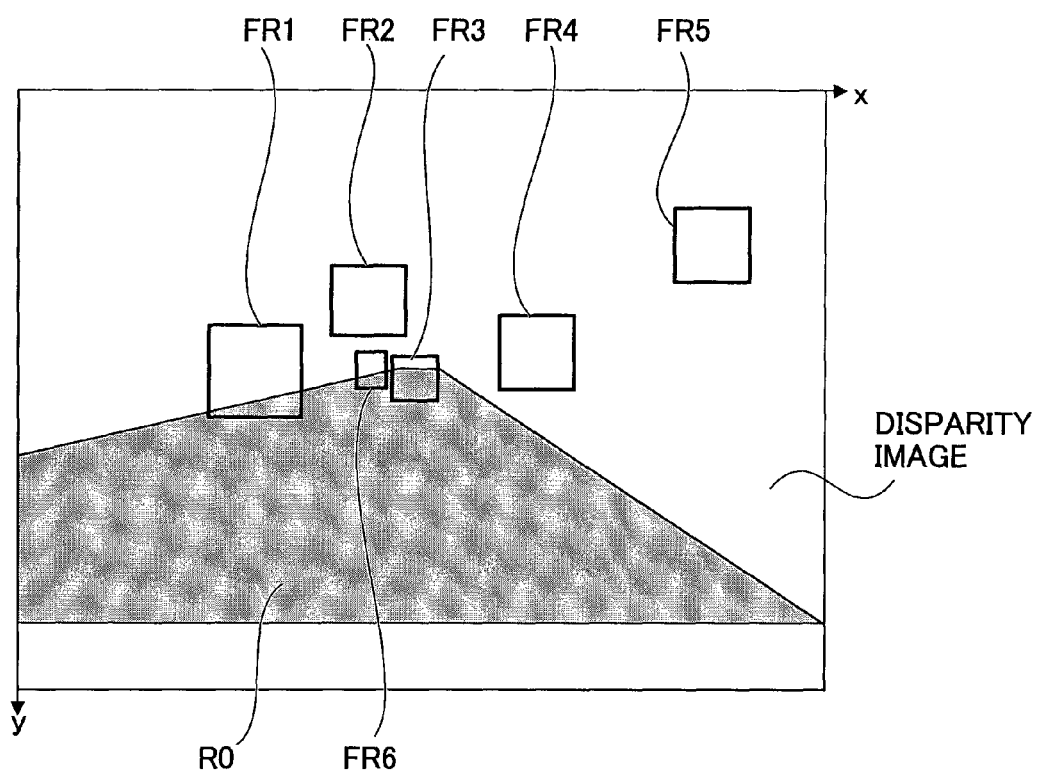
FIG. 12 shows the relation between the recognized candidate areas and a road area.

FIGS. 11 to 12 show one example of recognized candidate areas, indicated by frames FR1 to FR6. In FIG. 12 the frames FR1, FR3, FR6 overlap with the road area R0, therefore, they are subjected to object recognition. The frames FR2, FR4, FR5 do not overlap with the road area R0 and the weights are all zero, therefore, they are not subjected to object recognition. Not executing the object recognition on the non-overlapping blocks can reduce errors in the recognition and shorten the processing time.

Figure 13:
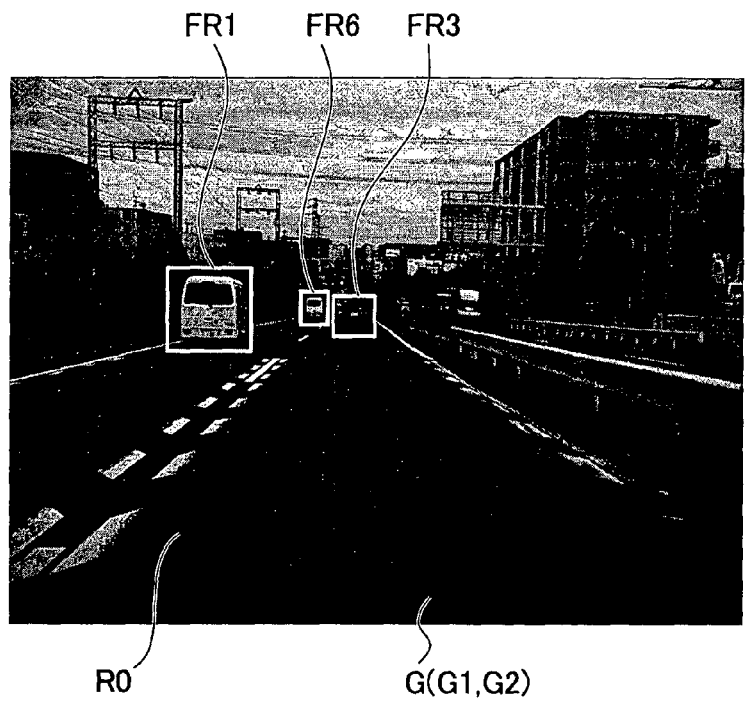
FIG. 13 shows an image containing objects to be tracked.

With the accuracy of object recognition secured, it is not necessary to obtain candidate areas, and the entire image frame is subjected to object recognition. Thereby, the target objects to be tracked are determined as shown in FIG. 13. They are given the same codes FR1, FR3, FR6 as the frames.

Figure 14:
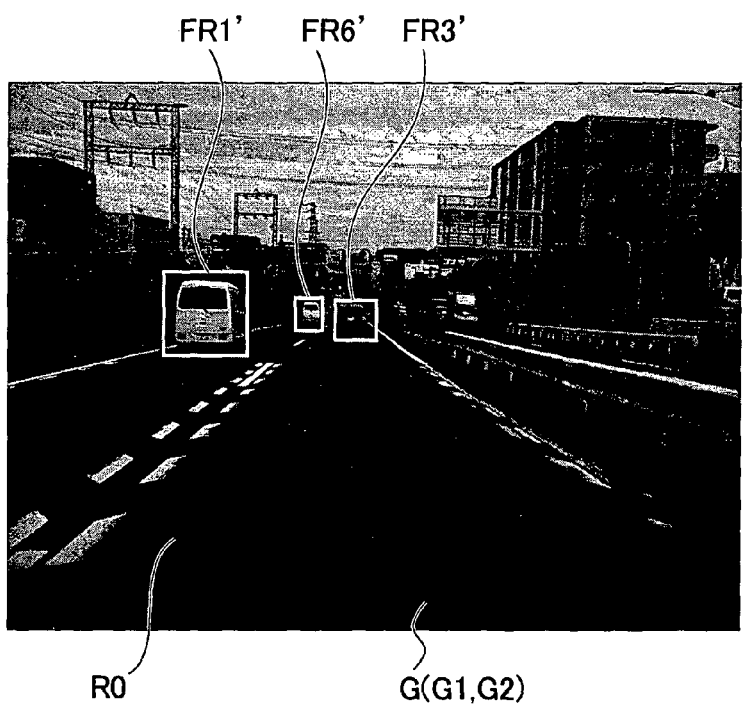
FIG. 14 shows a next frame of the image in FIG. 13 containing the objects.

Then, the tracking processor 24 tracks the objects FR1, FR3, FR6 recognized by the object recognizer 23 and finds the objects FR1', FR3', FR6' to be tracked in the next frame in FIG. 14.

For instance, using the objects FR1, FR3, FR6 as a template of initial target object, the candidate areas FR1', FR3', FR6' most similar to the objects FR1, FR3, FR6 are extracted and tracked in the next frame of the brightness image G.

Specifically, the objects FR1', FR3', FR6' most similar to the objects FR1, FR3, FR6 are searched for while the candidate areas FR1', FR3', FR6' are scanned on every pixel of the brightness image G from the top left corner.

The sizes of the objects may be changed between image frames. That is, the target objects may approach or move away from the vehicle 1 or rotate in the image frame, and the sizes thereof changes over time. Therefore, the sizes of the candidate areas FR1', FR3', FR6' are changed by a coefficient M while the target objects are searched.

The similarity between the objects FR1, FR3, FR6 and candidate areas FR1', FR3', FR6' is calculated according to the characteristic amount of the image, using the brightness histograms of the objects FR1, FR3, FR6 and candidate areas FR1', FR3', FR6'.

For instance, the brightness histogram of the object FR1 is assumed to be $q=[q_1, q_2, \ldots, q_n]$. $q_1, q_2, \ldots, q_n$ is the number of pixels from the brightness level 1 to n. Also, the brightness histogram of the area FR1' is assumed to be $p=[p_1, p_2, \ldots p_n]$. All the pixels of the area FR1' are normalized for obtaining the histogram to minimize the influence from the size change. $p_1, p_2, \ldots, p_n$ is the number of pixels from the brightness level 1 to n.

The similarity Sim between the object FR1 and candidate area FR1' is calculated by the following equation, for example:

$$Sim = \sum_{u=1}^{n} \sqrt{p_u * q_u} \tag{2}$$

The candidate areas FR1', FR3', FR6' having the largest similarity Sim in FIG. 14 are the results of tracking.

The distance calculator 25a finds distance information and position information on the objects in each image frame according to the tracking results from the tracking processor 24. The mean distances to the objects in the disparity image frame are calculated on the basis of the tracked positions in the brightness image frame.

Figure 15:
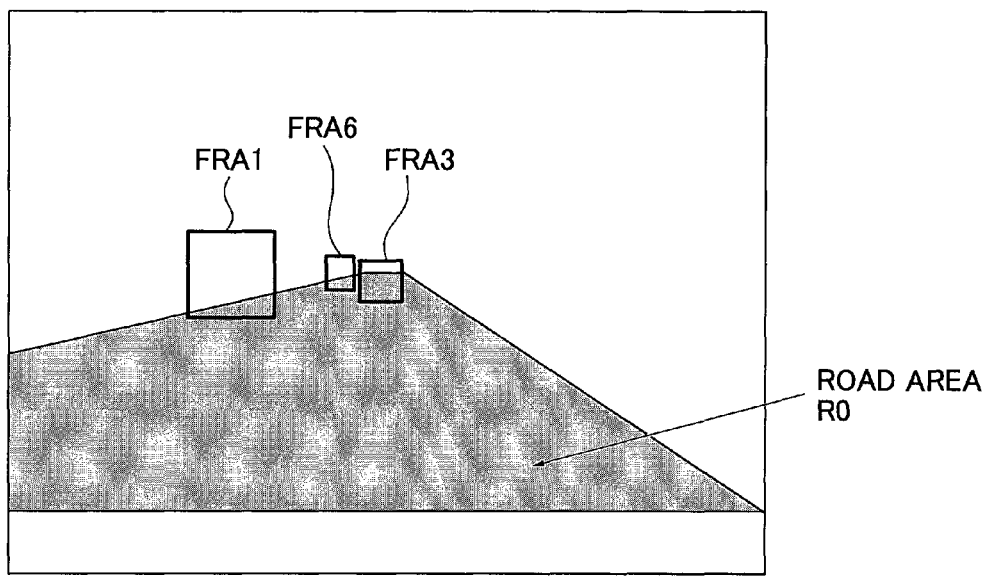
FIG. 15 shows a disparity image frame corresponding to a brightness image frame for object recognition.
Figure 16:
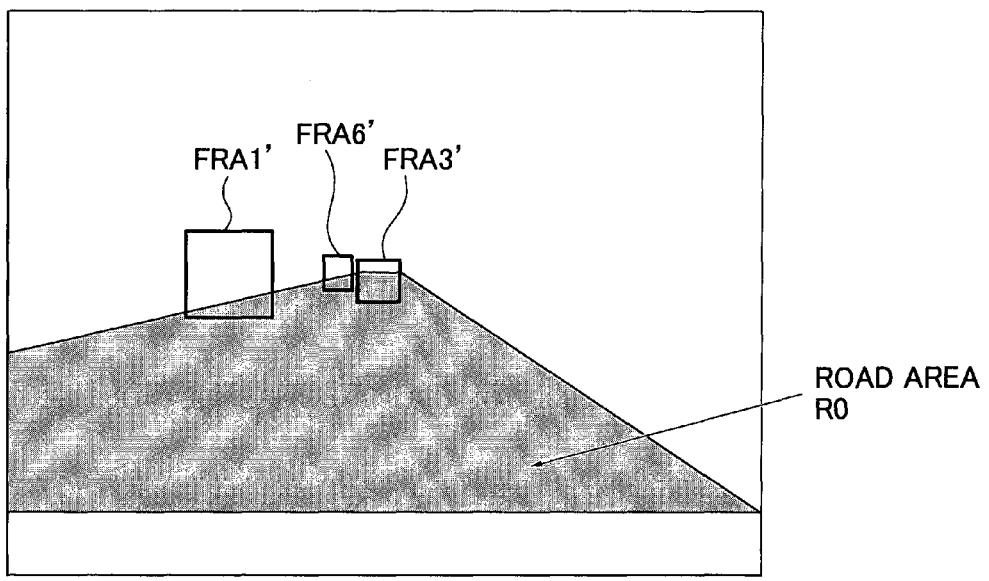
FIG. 16 shows a disparity image frame corresponding to a brightness image frame for object recognition.

FIGS. 15, 16 show disparity image frames corresponding to the brightness image frames for object recognition and for tracking, respectively. The positions of the objects in the disparity image frame are indicated by the frames, FRA1, FRA3, FRA6, FRA1', FRA3', FRA6'. The frames FRA1, FRA3, FRA6 are the objects to be tracked in the disparity image frame while the frames FRA1', FRA3', FRA6' are the tracking results in the next brightness image frame.

Then, the mean disparity values $\Delta$ of the frames or candidate areas FRA1, FRA3, FRA6 recognized from the brightness image frame are calculated to find distances from the target objects to the stereo camera. As apparent from FIG. 4, the relation between the disparity and the distance Z from the object to the stereo camera is expressed by the following equation:

$$\Delta : f = D : Z \tag{3}$$

The mean disparity value Δ is obtained by dividing the total sum of the disparity values of the object by the number of the disparity values used for calculating the total sum.

The distance Z is calculated by the following equation:

$$Z = D * f / \Delta \quad (4)$$

Similarly, the distances to the candidate areas FRA1', FRA3', FRA6' from the stereo camera are obtained.

That is, the distances ZA, ZC, ZE, ZA', ZC', ZE' to the objects in the image frames before and after the tracking are found. The motion calculator 25b calculates changes in the distances to the objects and transverse changes of the objects. The distance calculator 25a obtains differences ΔZA, ΔZC, ΔZE in the distances to the tracked objects ZA, ZC, ZE and ZA', ZC', ZE'.

$$\Delta ZA = ZA' - ZA$$

$$\Delta ZC = ZC' - ZC$$

$$\Delta ZE = ZE' - ZE$$

As obvious from FIG. 4, the lateral coordinates x of a pixel on the image and those X in real space are expressed by the following equation:

$$X : Z = x : f \quad (5)$$

The following equation is acquired from the above equation (5):

$$X = x * Z / f \quad (6)$$

By the equation (6) the transverse positions XA, XC, XE, XA', XC', XE' of the center of the moving objects before and after the tracking are obtained. A change in the transverse position of a vehicle between previous and current image frames means that the vehicle has transversely moved.

The moving amounts ΔXA, ΔXC, ΔXE of the center of the moving objects are calculated by the following equations:

$$\Delta XA = XA' - XA$$

$$\Delta XC = XC' - XC$$

$$\Delta XE = XE' - XE$$

Then, changes in the state of the moving objects are found from the changes in the distances to the objects and the transverse changes thereof. With changes in the distances ΔZA, ΔZC, ΔZE being a positive value, the vehicles ahead have accelerated or the vehicle 1 has decelerated. With the value being zero, there is no change in the distance. With the changes of a negative value, the vehicles ahead have put on the brake.

The accelerations VZA, VZC, VZE of velocity V of the target moving objects relative to the vehicle 1 are calculated on the basis of the changes in the distances between the image frames by the following equations:

$$VZA = \Delta ZA / \Delta t$$

$$VZC = \Delta ZC / \Delta t$$

$$VZE = \Delta ZE / \Delta t$$

where ΔZA, ΔZC, ΔZE are the differences in the distance to the target objects S1', S2', S3' before and after tracking.

A large value of the acceleration means that the vehicle ahead has put on the brake or accelerated suddenly. The accelerations VXA, VXC, VXE of the transverse positions of the target objects S1', S2', S3' between the image frames are calculated by the following equations:

$$VXA = \Delta XA / \Delta t$$

$$VXC = \Delta XC / \Delta t$$

$$VXE = \Delta XE / \Delta t$$

where ΔXA, ΔXC, ΔXE are differences from the original transverse points of the target objects S1', S2', S3' before and after tracking.

With the acceleration being a large value, the change in the motion of a vehicle ahead or pedestrian has been sharp. For example, a vehicle's lane change or cutting-in or a person's jumping-in may have occurred. In such a case the driver of the vehicle 1 needs to be warned. In view of this, the recognition result output 26 outputs the results of changes in the distances and velocities of the objects to the warning unit 3.

Figure 17:
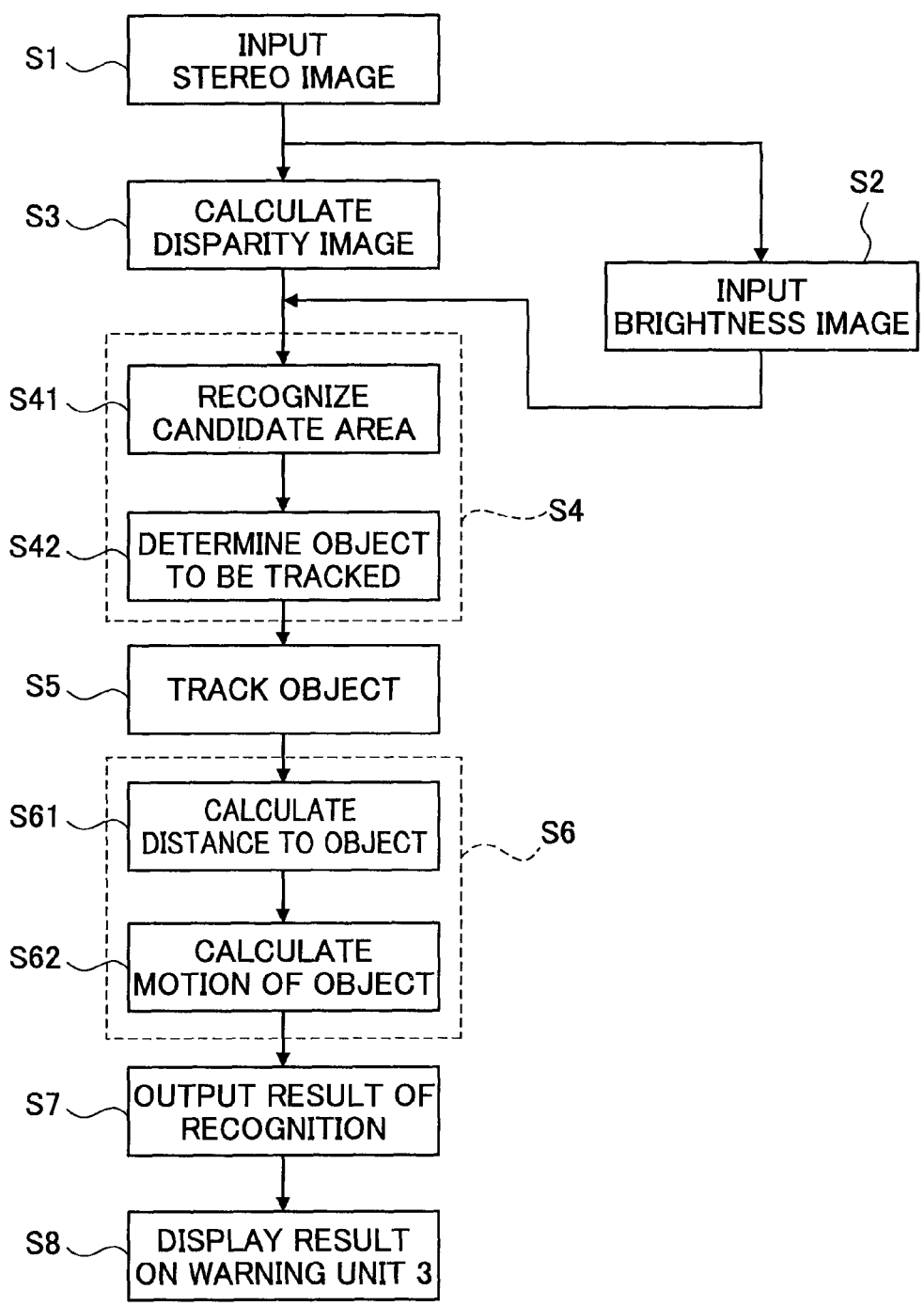
FIG. 17 is a flowchart for the operation of the moving object recognizer.

Next, the operation of the moving object recognizer 2 is described referring to the flowchart in FIG. 17. In step S1 the CPU 7 receives stereo images signals from the stereo camera consecutively and outputs a stereo image.

In step S2 the CPU 7 consecutively stores frames of at least one of images of the stereo image as a brightness image and generates a brightness image frame.

In step S3 the CPU 7 calculates a disparity between the images of the stereo image output in synchronization with the output of the brightness image frame and generates a disparity image frame.

In step S4 the CPU 7 recognizes an object from the brightness image frame obtained in step S2 and the disparity image frame obtained in step S3. The step S4 includes step S41 in which a candidate area of object is recognized from the disparity image frame and step S42 in which a target object to be tracked is determined.

In step S5 the CPU 7 tracks the object recognized in a previous image frame through brightness image frames obtained from the current and subsequent image frames.

In step S6 the CPU 7 calculates a change in the state of the tracked object in the disparity image frame synchronized with the brightness image frame.

The step S6 includes step S61 in which the distance to the target object is calculated and step S62 in which the velocity of a change in the distance to the object in a front-back direction and that of a change in the transverse motion of the object are calculated.

In step S7 the CPU 7 outputs the result of the motion of the object detected in step S6 from the recognition result output 26 to the warning unit 3 and displays it on the screen of the warning unit 3 in step S8. The circuit of the CPU 7 for executing the above operation is modularized.

According to the present embodiment, the moving object recognizer can recognize a target object as a vehicle at higher accuracy by using the disparity image frame and brightness image frame. Further, it can more accurately calculate the distance from the vehicle in question to the target object, a change in the distance, and a change in the state of the target object by detecting the change in the motion of the object from the disparity image frame.

In summary the moving object recognizer 2 first recognizes a moving object as a vehicle or person from a brightness image G and tracks it through the following brightness images G using brightness image frames.

It then calculates a mean disparity value Δ in the area of the tracked object from the disparity image frame synchronized with the brightness image frame. The distance to the moving object is calculated from the mean disparity value Δ.

The change amount of distance to the target object is calculated from the distance to the object in each image frame. The velocity of change in the object distance is calculated from the time interval between the image frames and the change in the object distance between the image frames. Thereby, a change in the state of the moving object can be recognized.

Also, the transverse motion amount of the object in the brightness image is found from the tracking result. Thereby, the motion amount thereof in real space can be calculated on the basis of the imaging position of the stereo camera.

Further, in the above embodiment the target objects to be tracked are limited to the objects S in the road area since the moving objects as vehicles are on the road, to improve the accuracy at which objects are recognized. The objects can be recognized at least from the brightness image frame.

The above embodiment has described an example where the moving object recognizer is incorporated in the automobile. However, the present invention should not be limited to such an example. It can be mounted in the other types of vehicle such as ship, airplane, robot. Further, the above embodiment has described the use of the moving object recognizer for the warning unit. Alternatively, it can be applied to a vehicle controller to control the driving of a vehicle relative to a moving object such as brake control or automatic steering.

Although the present invention has been described in terms of exemplary embodiments, it is not limited, thereto. It should be appreciated that variations or modifications may be made in the embodiments described by persons skilled in the art without departing from the scope of the present invention as defined by the following claims.

The invention claimed is:

1. A moving object recognizer, comprising:
   an image processing circuit to
      receive stereo image signals from a stereo camera consecutively, and generate a stereo image including two images; and
      consecutively store frames of at least one of the two images of the generated stereo image, and generate a brightness image frame; and
   processing circuitry configured to
      calculate a disparity between the two images of the stereo image, and generate a disparity image frame,
      to recognize an object at least from the brightness image frame;
      track an object recognized at a certain time in an image frame through brightness image frames obtained subsequent to the image frame in which the object was recognized at the certain time, and
      detect a change in a state of the tracked object from the disparity image frame and the corresponding brightness image frame at two different times, the detecting including, at each time, determining, in the brightness image frame, an area of the tracked object, and calculating, using the disparity image frame, a distance to the tracked object based on a mean disparity of the area of the tracked object.

2. The moving object recognizer according to claim 1, wherein
   the processing circuitry is further configured to track, in a current brightness image frame, the object recognized in a previous brightness image frame, and search the current brightness image frame for an object to be tracked, while changing a size of the object determined in the previous brightness image frame.

3. The moving object recognizer according to claim 2, wherein
   the processing circuitry is further configured to change, in the current brightness image frame, a size of an area corresponding to the object determined in the previous brightness image frame, and normalize a brightness of a pixel in the area in accordance with the size of the area for searching for the object to be tracked.

4. The moving object recognizer according to claim 3, wherein
   the processing circuitry is further configured to calculate a velocity of a change in a distance to the object in a front-back direction and a velocity of a change in a transverse motion of the object, from the mean disparity value of the area corresponding to the object.

5. The moving object recognizer according to claim 1, wherein
   the processing circuitry is further configured to detect the change in the state of the tracked object based on a change in center positions of the object in a previous and a current brightness image frame.

6. A vehicle, comprising
   a vehicle body including the moving object recognizer according to claim 1,
   a recognition result output to output a result of the detection by the processing circuitry, and
   a controller to receive a result of the detection and control a motion of the vehicle body relative to the object.

7. A vehicle, comprising:
   the moving object recognizer according to claim 1;
   a recognition result output to output a result of the detection by the processing circuitry; and
   a warning device that includes a display to issue a warning, upon receipt of the result of the detection.

8. The moving object recognizer of claim 1, wherein the processing circuitry is further configured to determine a change in the distance to the tracked object in a front-back direction, and a change in position of the tracked object in a transverse direction, based on the corresponding brightness image frames at the two different times.

9. The moving object recognizer of claim 8, wherein the processing circuitry is further configured to determine a velocity of the tracked object in the front-back direction and a velocity of the tracked object in the transverse direction.

10. A method of recognizing a moving object, comprising:
   receiving stereo image signals from a stereo camera consecutively, and generating a stereo image including two images;
   consecutively storing image frames of at least one of the two images of the generated stereo image, and generating a brightness image frame;
   calculating a disparity between the two images of the output stereo image, and generating a disparity image frame;
   recognizing an object at least from the brightness image frame;
   tracking an object recognized at a certain time in an image frame through brightness image frames obtained from image frames subsequent to the image frame in which the object was recognized at the certain time; and
   detecting a change in a state of the tracked object from the disparity image frame and the corresponding brightness image frame at two different times, the detecting including, at each time, determining, in the brightness image frame, an area of the tracked object, and calculating, using the disparity image frame, a distance to the tracked object based on a mean disparity of the area of the tracked object.

11. The method according to claim 10, further comprising tracking, in a current brightness image frame, the object recognized in a previous brightness image frame, and searching the current brightness image frame for an object to be tracked while changing a size of the object determined in the previous brightness image frame.

12. The method according to claim 11, further comprising changing, in a current brightness image frame, a size of an area corresponding to the object determined in the previous brightness image frame and normalizing a brightness of a pixel in the area in accordance with the size of the area for searching for the object to be tracked.

13. The method according to claim 12, further comprising calculating a velocity of a change in a distance to the object in a front-back direction and a velocity of a change in a transverse motion of the object, from the mean disparity value of the area corresponding to the object.

14. The method according to claim 10, further comprising detecting the change in the state of the tracked object based on a change in center positions of the object in a previous and a current brightness image frame.

15. The method of claim 10, further comprising determining a change in the distance to the tracked object in a front-back direction, and a change in position of the tracked object in a transverse direction, based on the corresponding brightness image frames at the two different times.

16. The method of claim 15, further comprising determining a velocity of the tracked object in the front-back direction and a velocity of the tracked object in the transverse direction.

* * * * *